(12) United States Patent
Brinkmann et al.

(10) Patent No.: US 11,794,713 B2
(45) Date of Patent: Oct. 24, 2023

(54) METHOD FOR LEAKAGE MONITORING OF A COMPRESSED-AIR SYSTEM

(71) Applicant: ZF CV SYSTEMS HANNOVER GMBH, Hannover (DE)

(72) Inventors: Stefan Brinkmann, Wunstorf (DE); Heinrich Diekmeyer, Barsinghausen (DE); Dirk Hillbring, Celle (DE)

(73) Assignee: ZF CV Systems Hannover GmbH, Hannover (DE)

( * ) Notice: Subject to any disclaimer, the term of this patent is extended or adjusted under 35 U.S.C. 154(b) by 173 days.

(21) Appl. No.: 17/422,852

(22) PCT Filed: Jan. 14, 2020

(86) PCT No.: PCT/EP2020/050772
§ 371 (c)(1),
(2) Date: Jul. 14, 2021

(87) PCT Pub. No.: WO2020/148257
PCT Pub. Date: Jul. 23, 2020

(65) Prior Publication Data
US 2022/0097668 A1    Mar. 31, 2022

(30) Foreign Application Priority Data

Jan. 14, 2019 (DE) .......................... 102019100788.7

(51) Int. Cl.
*B60T 17/22* (2006.01)
*G01M 3/26* (2006.01)
(Continued)

(52) U.S. Cl.
CPC ............. *B60T 17/221* (2013.01); *B60Q 9/00* (2013.01); *G01M 3/2815* (2013.01); *B60T 2270/406* (2013.01)

(58) Field of Classification Search
CPC ........ B60T 17/00; B60T 17/22; B60T 17/221; B60T 2270/406; B60Q 9/00
See application file for complete search history.

(56) References Cited

U.S. PATENT DOCUMENTS

| 5,221,125 A | 6/1993 | Okochi et al. |
| 2010/0237690 A1 | 9/2010 | Forster et al. |
| 2013/0304343 A1 | 11/2013 | Feyerabend et al. |

FOREIGN PATENT DOCUMENTS

| DE | 4118597 A1 | 12/1991 |
| DE | 102004005569 A1 | 8/2005 |

(Continued)

OTHER PUBLICATIONS

English translation of International Search Report for PCT/EP2020/050772 dated Apr. 23, 2020, 2 pages.
(Continued)

*Primary Examiner* — Nguyen Q. Ha
(74) *Attorney, Agent, or Firm* — WARNER NORCROSS + JUDD LLP

(57) ABSTRACT

A method for leakage monitoring of a compressed air system of a motor vehicle is disclosed. The compressed-air system has a compressed air supply system, a compressor, and a plurality of compressed-air consumer circuits. The method includes: a) successive detection of a supply pressure via a pressure sensor in a main supply line or in a supply line of at least one compressed air consumer circuit at a predefined time interval; b) successive calculation of pressure gradients of the supply pressure from at least two consecutively detected pressure values; c) comparison of the determined pressure gradients with a predefined gradient limit value; and d) output of a warning signal when the pressure gradient within a predefined monitoring time period which comprises (Continued)

a plurality of delivery pauses of the compressor has not exceeded the gradient limit value.

12 Claims, 2 Drawing Sheets

(51) Int. Cl.
    *B60Q 9/00*      (2006.01)
    *G01M 3/28*      (2006.01)

(56) References Cited

FOREIGN PATENT DOCUMENTS

| | | | |
|---|---|---|---|
| DE | 102007023819 | A1 | 11/2008 |
| DE | 102007025835 | A1 | 12/2008 |
| DE | 102007047691 | A1 | 4/2009 |
| DE | 102007025835 | B4 | 9/2012 |
| EP | 2465744 | A2 | 6/2012 |
| EP | 2537725 | A1 * | 12/2012 ............ B60T 17/221 |
| JP | 2004251798 | A * | 9/2004 .............. G01M 3/26 |
| WO | 2002014825 | A1 | 2/2002 |

OTHER PUBLICATIONS

Machine assisted English translation of DE102004005569A1 obtained from https://patents.google.com/patent on Jul. 13, 2021, 6 pages.
Machine assisted English translation of DE102007023819A1 obtained from https://patents.google.com/patent on Jul. 13, 2021, 6 pages.
Machine assisted English translation of DE102007025835A1 obtained from https://patents.google.com/patent on Jul. 13, 2021, 7 pages.
Machine assisted English translation of EP2465744A2 obtained from https://patents.google.com/patent on Jul. 13, 2021, 17 pages.
Machine assisted English translation of DE102007025835B4 obtained from https://patents.google.com/patent on Jul. 13, 2021, 7 pages.

* cited by examiner

METHOD FOR LEAKAGE MONITORING OF A COMPRESSED-AIR SYSTEM

CROSS-REFERENCE TO RELATED APPLICATIONS

This application is the National Stage of International Application No. PCT/EP2020/050772, filed on 14 Jan. 2020, which claims priority to and all advantages of German Patent Application No. 10 2019 100 788.7, filed on 14 Jan. 2019, the contents of which are hereby incorporated by reference.

FIELD OF THE DISCLOSURE

The invention relates to a method for leakage monitoring of a compressed air system of a motor vehicle, which compressed air system has a compressed air supply system, a compressor connected on the input side thereto, and a plurality of compressed air consumer circuits connected on the output side thereto, wherein a supply pressure is detected by sensor, a pressure gradient derived therefrom is compared with a predefined limit value and, in dependence on the result of the comparison, a warning signal is outputted.

BACKGROUND

Modern electronically controlled compressed air supply systems of road vehicles, such as in particular heavy commercial vehicles, and of rail vehicles have a compressed air conditioning unit with filter and dryer units, a multiple-circuit protection valve with overflow valves of a plurality of compressed air consumer circuits, and an electronic control unit with which there are also associated pressure sensors for detecting the supply pressures of at least some compressed air consumer circuits. Via a compressor, which is conventionally of the piston type and is able to be coupled to the drive motor of the motor vehicle in question by the engagement of an associated friction clutch or is able to be switched into delivery operation by the closing of a discharge valve or the switching on of an associated electric motor, air is drawn in from the surroundings in delivery operation, is compressed and is delivered via a dryer line of the compressed air conditioning unit into at least one main supply line. From the main supply line there branch, via in each case an overflow valve of a multiple-circuit protection valve, a plurality of supply lines of compressed air consumer circuits, to at least some of which there is connected a pressure sensor for detecting the supply pressure.

In order to maintain the functional capability of a compressed air system of a motor vehicle, in particular of the service brake circuits, for as long as possible, it is important to detect at an early stage a leakage which may have occurred within the compressed air system. While it is relatively easy to detect a leakage during a prolonged standstill of the vehicle, it is comparatively difficult to do so during driving operation owing to the opposing influences of a delivery operation of the compressor and the operation-related compressed air consumption in the compressed air consumer circuits. In order to detect a leakage in the compressed air supply system or in one of the compressed air consumer circuits, leakage monitoring methods are known which are based in principle on detecting by sensor a delivery or supply pressure or the pressure gradient of a delivery or supply pressure and comparing it with a predefined limit value and, in dependence on the result of the comparison, optionally outputting a warning signal.

Thus, there is known from WO 2002/014 825 A1 a method for leakage monitoring of a compressed air system of a motor vehicle having a compressor which can be driven by the drive motor, in which method, after the drive motor has been turned off, the current supply pressure in all the compressed air consumer circuits is detected by sensor and stored in a data memory as a function of the detection time. The profiles over time of the current supply pressure are compared with predefined reference pressure profiles. A leakage in one of the compressed air consumer circuits is detected in that the profile over time of the current supply pressure differs from the reference pressure profile by more than a predefined tolerance threshold. Consequently, the compressed air consumer circuit in question is disconnected from the compressed air supply.

In a diagnostic method of a compressed air supply system of a motor vehicle according to DE 10 2004 005 569 B4 it is provided that the profile over time of the supply pressure in at least one of the compressed air consumer circuits is detected by sensor and a pressure gradient is determined therefrom. The pressure gradient is classified according to driving operation states, such as braked driving state, unbraked driving state and stopped phase, and compared with a corresponding limit value parameter. If the pressure gradient differs too greatly from the limit value parameter, a leakage is detected and the compressed air consumer circuit in question is disconnected from the compressed air supply at least for a limited time.

From DE 10 2007 023 819 A1 there is known a method for monitoring the tightness of a compressed air system of a motor vehicle, in which, in at least one compressed air consumer circuit, the operating state of a compressed air consumer and, at a time interval, the supply pressure are detected. A characteristic value is determined from the operating state of the compressed air consumer and the pressure difference determined from the values of the supply pressure and is compared with a predefined comparison value. If the characteristic value differs by a larger amount from the comparison value, there is a leakage in the compressed air consumer circuit in question and a warning signal is outputted. Determination of the characteristic value preferably takes place when the compressed air consumer is inactive, that is to say when it is not consuming compressed air, and outside pressure build-up and pressure reduction phases of the compressed air consumer circuit.

In a diagnostic method of a compressed air supply system of a motor vehicle according to DE 10 2007 025 835 B4 it is provided that the profiles over time of the supply pressure and of the temperature in at least one compressed air consumer circuit are detected by sensor and at least one pneumatic time constant is determined therefrom. By comparing the time constant with a predefined limit value, a leakage is detected, if there is a larger difference, and the location of the leakage is determined by a further evaluation of the profiles over time. Disturbance variables, such as, for example, the removal of compressed air by compressed air consumers, are largely to be eliminated by suitable filtering of the profiles over time.

The known methods are either usable only when the motor vehicle is stopped or are subject to extensive operational constraints, such as the absence of delivery operation of the compressor and/or the absence of compressed air consumption by one of the compressed air consumers.

BRIEF SUMMARY

Accordingly, the object underlying the subject invention is to provide a method for leakage monitoring of a compressed air system of a motor vehicle of the type described above, with which leakages can be detected at an early stage without functional constraints and can be signaled by the outputting of a corresponding warning signal so that maintenance and repair measures can be taken in good time.

This object is achieved by the following method steps:

a) continuously detecting by sensor the supply pressure $p_V$ via a pressure sensor in a main supply line or in the supply line of at least one compressed air consumer circuit in a predefined time interval $\Delta t$, b) continuously calculating the pressure gradients grd_$p_V$ of the supply pressure $p_v$ from in each case at least two successively detected pressure values $p_{V\_i}$, $p_{V\_i+1}$ and the time difference $\Delta t$ between the detection thereof at least during the delivery pauses ($T_{FP1}$, $T_{FP2}$, $T_{FP3}$) of the compressor, c) comparing the determined pressure gradients grd_$p_V$ with a predefined gradient limit value grd_$p_G$, d) outputting a warning signal when the pressure gradient grd_$p_V$ within a predefined monitoring time period $T_M$, which comprises a plurality of delivery pauses $T_{FP1}$, $T_{FP2}$, $T_{FP3}$ of the compressor, has not exceeded the gradient limit value grd_$p_G$.

The method according to the invention is used in a compressed air system known per se of a motor vehicle, which compressed air system has a compressed air supply system, a compressor connected on the input side thereto, and a plurality of compressed air consumer circuits connected on the output side thereto. By the engagement of an associated friction clutch or by the closing of a discharge valve or by the switching on of an associated electric motor, the compressor is able to be switched into a delivery operation in which it draws in compressed air from the surroundings, compresses it and delivers it via a dryer line of a compressed air conditioning unit into at least one main supply line. From the main supply line there branch a plurality of supply lines of compressed air consumer circuits each having on the input side an overflow valve of a multiple-circuit protection valve, to at least some of which there is connected a pressure sensor and/or a compressed air container.

The basis of the proposed monitoring method is that there occur within the monitoring time period $T_M$ a plurality of delivery pauses of the compressor in which compressed air in the compressed air consumer circuits is removed to a larger extent and the predefined gradient limit value grd_$p_G$ is therefore not exceeded by the pressure gradient grd_$p_V$ of the supply pressure $p_V$. The method is likewise based on the fact that there occur within the monitoring time period $T_M$ a plurality of delivery pauses of the compressor in which no or almost no compressed air in the compressed air consumer circuits is removed and the gradient limit value grd_$p_G$ is therefore exceeded by the pressure gradient grd_$p_V$ of the supply pressure $p_V$ as long as there is no leakage in the compressed air supply system or in one of the compressed air consumer circuits. Without a leakage and without the removal of compressed air in the consumer circuits, the supply pressure $p_V$ is constant, so that the pressure gradient grd_$p_V$ in this case has the value zero. The gradient limit value grd_$p_G$ is usually set at a value less than zero.

The mentioned warning signal can be given by the illumination of a warning lamp on the dashboard or on the instrument panel of the motor vehicle, by the illumination of a corresponding warning symbol on the instrument panel, by the display of a corresponding warning text on a display of the instrument panel and/or by the storing of a corresponding fault message in a fault memory associated with the electronic control unit of the compressed air system.

The monitoring method according to the invention uses existing pressure sensors and is purely software-based. Accordingly, no additional outlay in terms of apparatus is necessary for the use of this monitoring method.

In order to achieve a pressure profile of the supply pressure pV that is advantageous for the method, it is preferably provided that pressure fluctuations of the supply pressure pv which are attributable to thermodynamic effects occurring in the compressed air consumer circuits are eliminated. This can take place, for example, with the aid of mathematical methods.

For this purpose, the pressure values $p_{V\_i}$, $p_{V\_i+1}$ detected by sensor and/or the calculated values of the pressure gradient grd_$p_V$ can be low-pass-filtered. The limit frequency $f_G$ of the low-pass filtering of the pressure values $p_{V\_i}$, $p_{V\_i+1}$ detected by sensor lies in the range between 0.1 Hz and 0.3 Hz, including the range limits.

It is likewise advantageous for this purpose if the calculated values of the pressure gradient grd_$p_V$ are low-pass-filtered for a set time period $T_A$ after the determination of a pronounced drop in the supply pressure $p_V$. After a larger drop in the supply pressure $p_V$, which can be caused by the removal of a larger amount of compressed air in one of the compressed air consumer circuits, a pressure rise based on thermodynamic effects subsequently occurs. This disturbing effect is eliminated by the low-pass filtering of the calculated values of the pressure gradient grd_$p_V$.

As an alternative to this low-pass filtering, it can also be provided for this purpose that the calculation of the values of the pressure gradient grd_$p_V$ or the comparison of the pressure gradient grd_$p_V$ with the gradient limit value grd_$p_G$ is suspended for a previously set time period $T_A$ after the determination of a pronounced drop of a previously set larger reduction of the supply pressure $p_V$.

It can additionally be provided that the comparison of the pressure gradient grd_$p_V$ with the gradient limit value grd_$p_G$ does not take place at positive pressure gradients.

Since a regeneration operation of the compressed air supply system and permanent compressed air consumption by a compressed air consumer leads to a continuous removal of air, which eclipses a possible leakage, it is advantageous if, during a regeneration operation of the compressed air supply system and/or when a compressed air consumer with permanent compressed air consumption is present, there is used in the comparison of the determined pressure gradient grd_$p_V$ with a gradient limit value instead of the previous gradient limit value grd_$p_G$ a correspondingly reduced gradient limit value grd_$p_{G\_R}$ (grd_$p_{G-R}$<grd_$p_G$).

The monitoring time period $T_M$ in which the pressure gradients grd_$p_V$ of the supply pressure $p_V$ in a plurality of delivery pauses of the compressor are compared with the gradient limit value grd_$p_G$ can be defined in various ways.

Thus, the monitoring time period $T_M$ can be defined as the cumulative operating time of the motor vehicle.

It is likewise possible that the monitoring time period $T_M$ is defined as the cumulative distance travelled by the motor vehicle.

In order to relate the monitoring time period $T_M$ concretely to the delivery pauses of the compressor, it is advantageous if the monitoring time period $T_M$ is defined as the cumulative delivery pause of the compressor.

The monitoring method according to the invention makes it possible to keep a plurality of leakage accounts for different leakage causes, wherein the gradient limit value grd_$p_G$ and/or the nature and length of the monitoring time period $T_M$ can be set differently for the monitoring of different leakage causes.

For the detection of specific leakage causes it is advantageous to carry out the calculation of the values of the pressure gradient grd_$p_V$ not in the entire pressure range of, for example, $p_V$=10 to 12.5 bar but only in a limited range of the supply pressure $p_V$.

BRIEF DESCRIPTION OF DRAWINGS

The foregoing aspects and many of the attendant advantages will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

Figure 2:
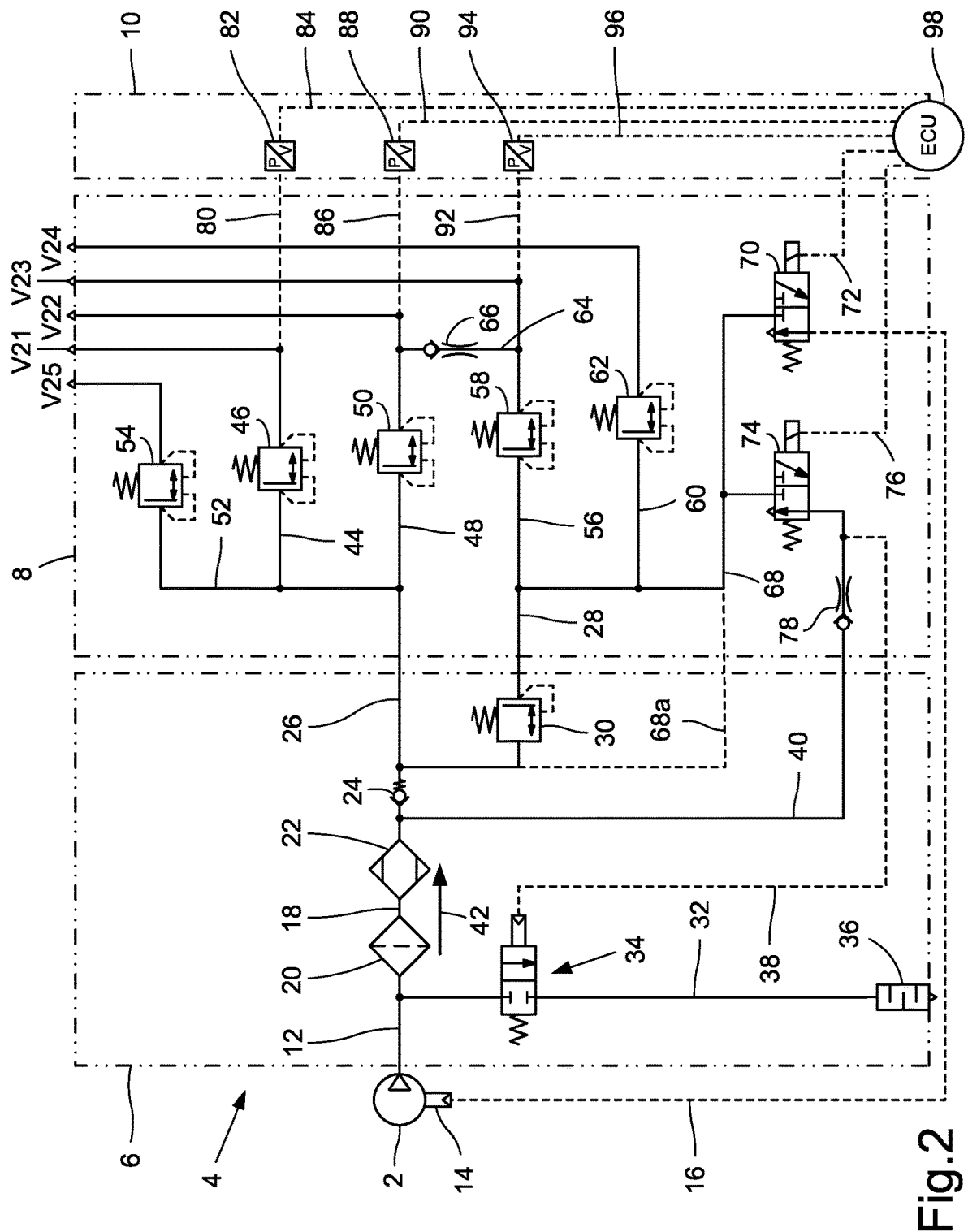
FIG. 2 shows the schematic construction of a typical compressed air supply system of a motor vehicle, in which the method according to the invention can be carried out.

In FIG. 2, a compressor 2 and an electronically controlled compressed air supply system 4 of a motor vehicle are shown in schematic form, in which the method according to the invention for leakage monitoring of a compressed air system can be used. The compressed air supply system 4 has the assembly groups of a compressed air conditioning unit 6, a multiple-circuit protection valve unit 8 and an electronic control unit 10.

The compressor 2 is connected on the output side to a delivery line 12 and has a control pressure input 14. By applying a sufficiently high control pressure to the control pressure input 14 from a connected control pressure line 16, a friction coupling, not shown, is engaged, whereby the compressor 2 is connected for drive to a drive motor, not shown, of the motor vehicle and is thereby switched into delivery operation. In delivery operation, the compressor 2 draws in air from the surroundings and delivers it as compressed air into the delivery line 12.

The compressed air conditioning unit 6 has a dryer line 18 in which there are arranged, in succession in a conveying direction indicated by the direction arrow 42, a filter unit 20, a dryer unit 22 and a non-return valve 24. The dryer line 18 is connected on the input side to the delivery line 12 and branches on the output side into two main supply lines 26, 28. The second main supply line 28 is limited in terms of its maximum pressure by a built-in pressure limiting valve 30. Upstream of the filter unit 20, a vent line 32 branches from the dryer line 18, in which vent line there is arranged a vent valve 34 and which leads via a sound suppressor 36 into the surroundings. The vent valve 34 is in the form of a pressure-controlled 2/2-way changeover valve which is closed in the control-pressureless state and can be opened by the application of a sufficiently high control pressure to a control pressure line 38 connected to its control pressure input. Between the dryer unit 22 and the non-return valve 24, a regeneration line 40 is connected to the dryer line 18.

The multiple-circuit protection valve unit 8 comprises five overflow valves 46, 50, 54, 58, 62 of a multiple-circuit protection valve, not shown in greater detail, a regeneration control valve 74, a compressor control valve 70 and two throttle-type non-return valves 66, 78. In the multiple-circuit protection valve unit 8, the first main supply line 26 branches into three supply lines 44, 48, 52 of three compressed air consumer circuits V21, V22, V25. The compressed air consumer circuits V21, V22, V25 are, for example, a first service brake circuit of the motor vehicle V21, a second service brake circuit of the motor vehicle V22 and an air suspension circuit V25.

The pressure-limited second main supply line 28 branches in the multiple-circuit protection valve unit 8 into the two supply lines 56, 60 of two further compressed air consumer circuits V23, V24 and into a control pressure main line 68. The further compressed air consumer circuits V23, V24 are, for example, a trailer and parking brake circuit V23 and an auxiliary consumer circuit V24. One of the overflow valves 46, 50, 54, 58, 62 of the multiple-circuit protection valve is arranged in each of the supply lines 44, 48, 52, 56, 60 of the mentioned compressed air consumer circuits V21, V22, V23, V24, V25. The alternative control pressure main line 68a depicted by a broken line illustrates that the control pressure main line 68 can also branch from the first main supply line 26 between the non-return valve 24 and the pressure limiting valve 30.

On the output side of the overflow valves 58, 50 in question, a connecting line 64 having the throttle-type non-return valve 66 that opens in the direction of the supply line 48 of the second service brake circuit V22 is arranged between the supply line 56 of the trailer and parking brake circuit V23 and the supply line 48 of the second service brake circuit V22. Via this connection, compressed air can flow in the case of a corresponding pressure gradient from the trailer and parking brake circuit V23 into the second service brake circuit V22 and fill the second service brake circuit, and the trailer and parking brake circuit V23 can be emptied.

The compressor control valve 70 and the regeneration control valve 74 are connected on the input side to the control pressure main line 68. The two control valves 70, 74 are each in the form of a 3/2-way magnetic switching valve, the connections on the input side of which are blocked in the deenergized state and which are switchable by the energization of an associated electrical control line 72, 76. By energization of the compressor control valve 70, the control pressure line 16 connected to the compressor control valve 70 on the output side is connected to the control pressure main line 68, whereby the friction clutch at the compressor 2 is disengaged and the compressor 2 is uncoupled from the drive motor. When the control pressure input 14 of the compressor 2 is pressureless, the friction clutch of the compressor 2 is engaged, so that the compressor 2 is then in delivery operation when the drive motor is running. In delivery operation, the compressor 2 delivers compressed air, in the delivery direction indicated by the direction arrow 42, through the delivery line 12, the filter unit 20, the dryer line 18, the filter unit 20, the dryer unit 22 and the non-return valve 24 into the two main supply lines 26, 28 and via the overflow valves 46, 50, 54, 58, 62 of the multiple-circuit protection valve further into the mentioned compressed air consumer circuits V21, V22, V23, V24, V25.

By energization of the regeneration control valve 74, the regeneration line 40 connected on the output side thereto, in which the throttle-type non-return valve 78 that opens in the direction of the dryer line 18 is arranged, is connected to the control pressure main line 68. The control pressure line 38 of the vent valve 34, which is connected to the regeneration line 40 between the regeneration control valve 74 and the throttle-type non-return valve 78, is thereby also subjected to the pressure prevailing in the control pressure main line 68, whereby the vent valve 34 is opened. As a result, already dried compressed air then flows from the second main supply line 28 via the control pressure main line 68 and the regeneration line 40 contrary to the delivery direction 42 through the dryer unit 22 and the filter unit 20 via the vent line 32 and the sound suppressor 36 into the surroundings, whereby the dryer unit 22 is regenerated and the filter unit 20 is cleaned.

A pressure sensor 82, 88, 94 is connected to the supply lines 44, 48, 56 of the first service brake circuit V21, of the second service brake circuit V22 and of the trailer and parking brake circuit V23 via in each case a connection line 80, 86, 92. The pressure sensors 82, 88, 94 are each connected via an electrical sensor line 84, 90, 96 to an electronic control unit 98 (ECU). The compressor control valve 70 and the regeneration control valve 74 are likewise connected to the electronic control unit 98 for signaling via their electrical control lines 72, 76. The three pressure sensors 82, 88, 94 and the electronic control unit 98 are combined in the assembly group of the electronic control unit 10.

The method according to the invention for leakage monitoring of a compressed air system will be explained hereinbelow by way of example with reference to the above-described embodiment and arrangement of the compressor 2 and of the compressed air supply system 4 via the diagram of FIG. 1.

In the diagram, the delivery pressure $p_F$ acting at the output of the compressor 2 in the delivery line 12 and the supply pressure pV acting in one of the supply lines 44, 48, 56 and detected via a pressure sensor 82, 88, 94 are shown over time t. The delivery pressure pF of the compressor 2 is not itself detected by sensor and is in the present case contained in the diagram of FIG. 1 only for better understanding. There are further shown in the diagram of FIG. 1 the profiles over time of the low-pass-filtered supply pressure pV_F, of the pressure gradient $grd\_p_V$ determined from the values of the low-pass-filtered supply pressure $p_{V\_F}$, of a gradient limit value $grd\_p_G$ and of a gradient limit value $grd\_p_{G\text{-}R}$ provided for a regeneration operation of the compressed air supply system 4 and correspondingly reduced.

The leakage monitoring method provides that the supply pressure $p_V$ in the supply line 44, 48 of at least one compressed air consumer circuit V21, V22 provided with a pressure sensor 82, 88 is continuously detected by sensor in a predefined time interval Δt. The determined pressure values of the supply pressure $p_V$ are then low-pass-filtered with a limit frequency $f_G$ which lies in the range between 0.1 Hz and 0.3 Hz (0.1 Hz≤$f_G$≤0.3 Hz). At least during the delivery pauses $T_{FP1}$, $T_{FP2}$, $T_{FP3}$ of the compressor 2, the pressure gradients $grd\_p_V$ of the supply pressure $p_V$ are then continuously calculated from in each case at least two successively detected and low-pass-filtered pressure values $p_{V\_i}$, $p_{V+1}$ and the time difference Δt between the detection thereof.

These pressure gradients $grd\_p_V$ are compared with a predefined gradient limit value $grd\_p_G$ which has been determined in a suitable manner beforehand, for example during the development and testing of the motor vehicle in question or the application of the compressed air system in the motor vehicle.

Figure 1:
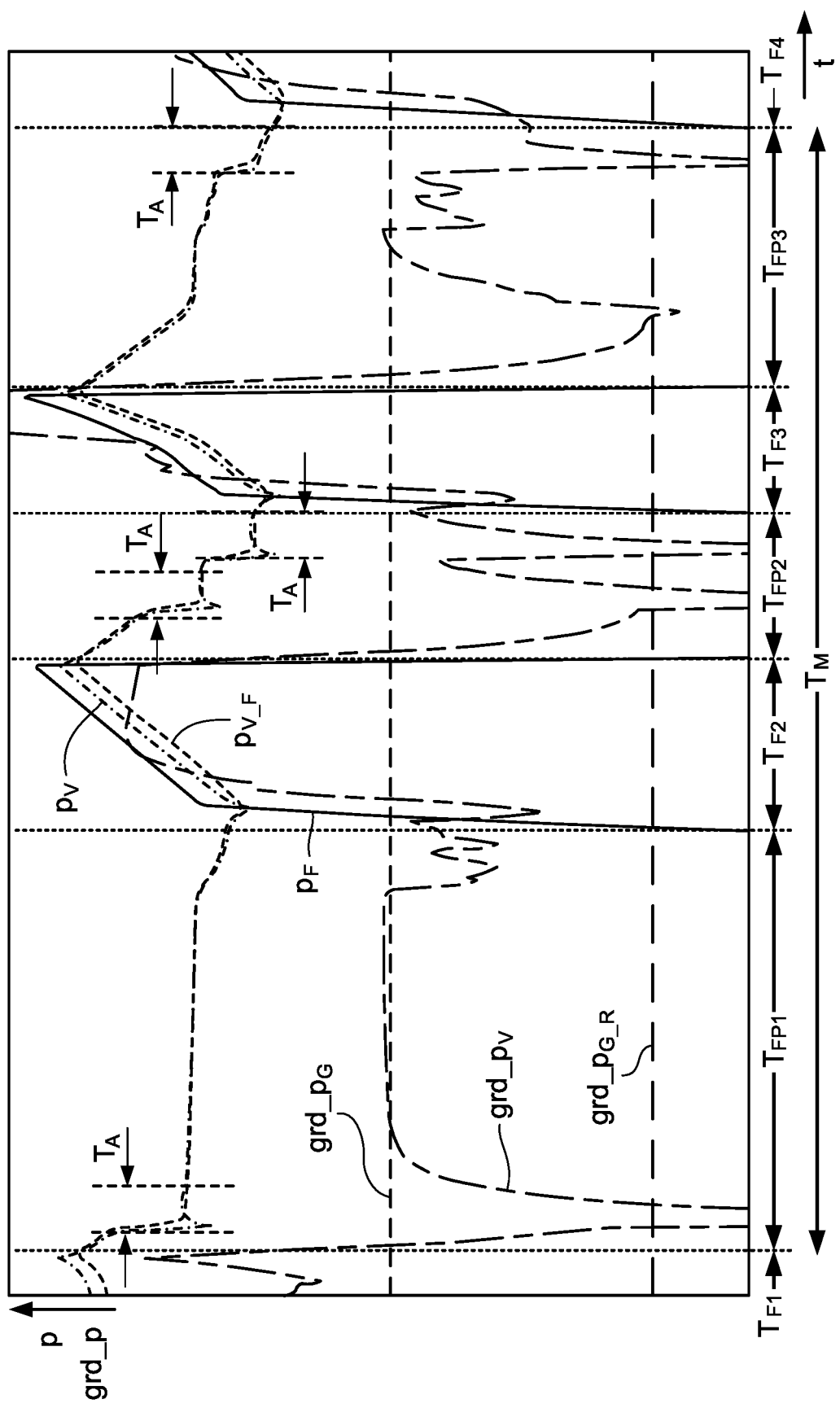
FIG. 1 is a diagram showing the profiles over time of different characteristic values of a compressed air supply system.

If the pressure gradient $grd\_p_V$ of the low-pass-filtered supply pressure $p_{V\_F}$ has not exceeded the gradient limit value $grd\_p_G$ within a predefined monitoring time period $T_M$, which can be regarded, for example, as the time period illustrated in the diagram of FIG. 1, during the delivery pauses $T_{FP1}$, $T_{FP2}$, $T_{FP3}$ of the compressor 2, a warning signal is outputted.

The warning signal can be given by the illumination of a warning lamp on the dashboard or on the instrument panel of the motor vehicle, by the illumination of a corresponding warning symbol on the instrument panel, by the display of a corresponding warning text on a display of the instrument panel and/or by the storage of a corresponding fault message in a fault memory associated with the electronic control unit 10 of the compressed air supply system 4.

The time period TM depicted in the diagram of FIG. 1 comprises three delivery pauses $T_{FP1}$, $T_{FP2}$, $T_{FP3}$ of the compressor 2. Since the pressure gradient $grd\_p_V$ of the supply pressure pv has exceeded the predefined gradient limit value $grd\_p_G$ in the first delivery pause $T_{FP1}$ and in the third delivery pause $T_{FP3}$, it is assumed in the present example case that operation is leakage-free and no warning signal is outputted.

In the delivery pauses $T_{FP1}$, $T_{FP2}$, $T_{FP3}$ there is a larger drop in the supply pressure $p_V$ four times owing to the removal in each case of a larger amount of compressed air in one of the compressed air consumer circuits. In the following time period $T_A$, thermodynamic effects occur which lead to a pressure increase of the supply pressure $p_V$. As an alternative to the above-described method with low-pass filtering, the pressure gradient $grd\_p_V$ can also be calculated using the supply pressure $p_V$ without low-pass filtering. In order to eliminate the disturbing effect of the rise in pressure, the comparison of the pressure gradient $grd\_p_V$ with the gradient limit value $grd\_p_G$ is suspended for a previously set time period $T_A$. Accordingly, only the profile of the pressure gradient $grd\_p_V$ without low-pass filtering within the delivery pauses $T_{FP1}$, $T_{FP2}$, $T_{FP3}$ of the compressor 2 outside the time period $T_A$ in question is significant for the detection of a leakage.

For further illustration, the diagram of FIG. 1 also shows a gradient limit value $grd\_p_{G\_R}$ provided for a regeneration operation of the compressed air supply system 4 which here is present at the start of each of the delivery pauses $T_{FP1}$, $T_{FP2}$, $T_{FP3}$, which gradient limit value is correspondingly lowered compared to the gradient limit value $grd\_p_G$ applicable for normal operation ($grd\_p_{G\_R}$<$grd\_p_G$). Via the lowered gradient limit value $grd\_p_{G\_R}$, account is taken of the reduction of the supply pressure pv and of the pressure gradient $grd\_p_V$ of the supply pressure $p_V$ that is caused by the compressed air volume flow removed through the second main supply line 28 for regeneration of the dryer unit 22.

Within the scope of the monitoring method, a plurality of leakage accounts can be kept for different leakage causes, for which the gradient limit value $grd\_p_G$ and/or the nature and length of the monitoring time period $T_M$ can be set in different ways. Likewise, in order to detect specific leakage causes, the calculation of the pressure gradient $grd\_p_V$ can be carried out in only a limited range of the supply pressure $p_V$.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

LIST OF REFERENCE SIGNS 2 compressor
4 compressed air supply system
6 compressed air conditioning unit (assembly group)
8 multiple-circuit protection valve unit (assembly group)
10 electronic control unit (assembly group)
12 delivery line
14 control pressure input
16 control pressure line
18 dryer line
20 filter unit
22 dryer unit
24 non-return valve
26 first main supply line
28 second main supply line
30 pressure limiting valve
32 vent line
34 vent valve
36 sound suppressor
38 control pressure line
40 regeneration line
42 direction arrow, delivery direction
44 supply line
46 overflow valve
48 supply line
50 overflow valve
52 supply line
54 overflow valve
56 supply line
58 overflow valve
60 supply line
62 overflow valve
64 connecting line
66 throttle-type non-return valve
68 control pressure main line
68a alternative control pressure main line
70 compressor control valve
72 electrical control line
74 regeneration control valve
76 electrical control line
78 throttle-type non-return valve
80 connection line
82 pressure sensor
84 electrical sensor line
86 connection line
88 pressure sensor
90 electrical sensor line
92 connection line
94 pressure sensor
96 electrical sensor line
98 electronic control unit (ECU)
$f_G$ limit frequency
grd_p pressure gradient (general)
grd_$p_G$ gradient limit value
grd_$p_{G\_R}$ reduced gradient limit value
grd_$p_V$ pressure gradient of the supply pressure
p pressure (general)
$p_F$ delivery pressure of the compressor
$p_V$ supply pressure
$p_{V\_F}$ low-pass-filtered supply pressure
$p_{V\_i}$ $i^{th}$ measured value of the supply pressure
$p_{V\_i+1}$ $(i+1)^{th}$ measured value of the supply pressure
t time
$T_A$ time period
$T_M$ monitoring time period
$T_{F1}$ first delivery operation duration
$T_{F2}$ second delivery operation duration
$T_{F3}$ third delivery operation duration
$T_{F4}$ fourth delivery operation duration
$T_{FP1}$ first delivery pause
$T_{FP2}$ second delivery pause
$T_{FP3}$ third delivery pause
V21 compressed air consumer circuit, first service brake circuit
V22 compressed air consumer circuit, second service brake circuit
V23 compressed air consumer circuit, trailer and parking brake circuit
V24 compressed air consumer circuit, auxiliary consumer circuit
V25 compressed air consumer circuit, air suspension circuit
Δt time interval, time difference

The invention claimed is:

1. A method for leakage monitoring of a compressed air system of a motor vehicle, the compressed air system having a compressed air supply system, a compressor connected on an input side thereto, and a plurality of compressed air consumer circuits connected on an output side thereto, said method comprising:

a) continuously detecting by sensor a supply pressure via a pressure sensor in a main supply line or in a supply line of at least one compressed air consumer circuit in a predefined time interval, b) continuously calculating the pressure gradients of the supply pressure from in each case at least two successively detected pressure values and a time difference between the detection thereof at least during delivery pauses of the compressor, c) comparing the determined pressure gradients with a predefined gradient limit value, and d) outputting a warning signal when the pressure gradient within a predefined monitoring time period, which comprises a plurality of delivery pauses of the compressor, has not exceeded the gradient limit value, wherein pressure fluctuations of the supply pressure which are attributable to thermodynamic effects occurring in the compressed air consumer circuits are eliminated.

2. The method as claimed in claim 1, wherein the pressure values detected by sensor and/or the calculated values of the pressure gradient are low-pass-filtered.

3. The method as claimed in claim 2, wherein the limit frequency of the low-pass filtering of the pressure values detected by sensor and/or of the calculated values of the pressure gradient lies in the range from 0.1 Hz to 0.3 Hz.

4. The method as claimed in claim 1, wherein the calculated values of the pressure gradient are low-pass-filtered for a set time period after the determination of a pronounced drop in the supply pressure.

5. The method as claimed in claim 1, wherein the comparison of the pressure gradient with the gradient limit value does not take place at positive pressure gradients.

6. The method as claimed in claim 1, wherein the calculation of the values of the pressure gradient or the comparison of the pressure gradient with the gradient limit value is suspended for a set time period after the determination of a pronounced drop in the supply pressure.

7. A method for leakage monitoring of a compressed air system of a motor vehicle, the compressed air system having a compressed air supply system, a compressor connected on an input side thereto, and a plurality of compressed air consumer circuits connected on an output side thereto, said method comprising:

a) continuously detecting by sensor a supply pressure via a pressure sensor in a main supply line or in a supply line of at least one compressed air consumer circuit in a predefined time interval, b) continuously calculating the pressure gradients of the supply pressure from in each case at least two successively detected pressure values and a time difference between the detection thereof at least during delivery pauses of the compressor, c) comparing the determined pressure gradients with a predefined gradient limit value, and d) outputting a warning signal when the pressure gradient within a predefined monitoring time period, which comprises a plurality of delivery pauses of the compressor, has not exceeded the gradient limit value, wherein, during a regeneration operation of the compressed air supply system and/or when a compressed air consumer with permanent compressed air consumption is present, there is used in the comparison of the determined pressure gradient with a gradient limit value instead of the previous gradient limit value a correspondingly reduced gradient limit value.

8. A method for leakage monitoring of a compressed air system of a motor vehicle, the compressed air system having a compressed air supply system, a compressor connected on an input side thereto, and a plurality of compressed air consumer circuits connected on an output side thereto, said method comprising:

a) continuously detecting by sensor a supply pressure via a pressure sensor in a main supply line or in a supply line of at least one compressed air consumer circuit in a predefined time interval, b) continuously calculating the pressure gradients of the supply pressure from in each case at least two successively detected pressure values and a time difference between the detection thereof at least during delivery pauses of the compressor, c) comparing the determined pressure gradients with a predefined gradient limit value, and d) outputting a warning signal when the pressure gradient within a predefined monitoring time period, which comprises a plurality of delivery pauses of the compressor, has not exceeded the gradient limit value, wherein the monitoring time period is defined as the cumulative operating time of the motor vehicle.

9. A method for leakage monitoring of a compressed air system of a motor vehicle, the compressed air system having a compressed air supply system, a compressor connected on an input side thereto, and a plurality of compressed air consumer circuits connected on an output side thereto, said method comprising:

a) continuously detecting by sensor a supply pressure via a pressure sensor in a main supply line or in a supply line of at least one compressed air consumer circuit in a predefined time interval, b) continuously calculating the pressure gradients of the supply pressure from in each case at least two successively detected pressure values and a time difference between the detection thereof at least during delivery pauses of the compressor, c) comparing the determined pressure gradients with a predefined gradient limit value, and d) outputting a warning signal when the pressure gradient within a predefined monitoring time period, which comprises a plurality of delivery pauses of the compressor, has not exceeded the gradient limit value, wherein the monitoring time period is defined as the cumulative distance travelled by the motor vehicle.

10. A method for leakage monitoring of a compressed air system of a motor vehicle, the compressed air system having a compressed air supply system, a compressor connected on an input side thereto, and a plurality of compressed air consumer circuits connected on an output side thereto, said method comprising:

a) continuously detecting by sensor a supply pressure via a pressure sensor in a main supply line or in a supply line of at least one compressed air consumer circuit in a predefined time interval, b) continuously calculating the pressure gradients of the supply pressure from in each case at least two successively detected pressure values and a time difference between the detection thereof at least during delivery pauses of the compressor, c) comparing the determined pressure gradients with a predefined gradient limit value, and d) outputting a warning signal when the pressure gradient within a predefined monitoring time period, which comprises a plurality of delivery pauses of the compressor, has not exceeded the gradient limit value, wherein the monitoring time period is defined as the cumulative delivery pause of the compressor.

11. A method for leakage monitoring of a compressed air system of a motor vehicle, the compressed air system having a compressed air supply system, a compressor connected on an input side thereto, and a plurality of compressed air consumer circuits connected on an output side thereto, said method comprising:
   a) continuously detecting by sensor a supply pressure via a pressure sensor in a main supply line or in a supply line of at least one compressed air consumer circuit in a predefined time interval,
   b) continuously calculating the pressure gradients of the supply pressure from in each case at least two successively detected pressure values and a time difference between the detection thereof at least during delivery pauses of the compressor,
   c) comparing the determined pressure gradients with a predefined gradient limit value, and
   d) outputting a warning signal when the pressure gradient within a predefined monitoring time period, which comprises a plurality of delivery pauses of the compressor, has not exceeded the gradient limit value,
   wherein a plurality of leakage accounts are kept for different leakage causes, and wherein the gradient limit value and/or the nature and length of the monitoring time period is set differently for the monitoring of different leakage causes.

12. A method for leakage monitoring of a compressed air system of a motor vehicle, the compressed air system having a compressed air supply system, a compressor connected on an input side thereto, and a plurality of compressed air consumer circuits connected on an output side thereto, said method comprising:
   a) continuously detecting by sensor a supply pressure via a pressure sensor in a main supply line or in a supply line of at least one compressed air consumer circuit in a predefined time interval,
   b) continuously calculating the pressure gradients of the supply pressure from in each case at least two successively detected pressure values and a time difference between the detection thereof at least during delivery pauses of the compressor,
   c) comparing the determined pressure gradients with a predefined gradient limit value, and
   d) outputting a warning signal when the pressure gradient within a predefined monitoring time period, which comprises a plurality of delivery pauses of the compressor, has not exceeded the gradient limit value,
   wherein, for the detection of specific leakage causes, the calculation of the values of the pressure gradient is carried out in only a limited range of the supply pressure.

* * * * *